United States Patent [19]

Gellermann et al.

[11] Patent Number: 4,638,485

[45] Date of Patent: Jan. 20, 1987

[54] SOLID STATE VIBRATIONAL LASERS USING F-CENTER/MOLECULAR-DEFECT PAIRS IN ALKALI HALIDES

[75] Inventors: Werner Gellermann; Yihong Yang; Fritz Luty, all of Salt Lake City, Utah

[73] Assignee: University of Utah, Salt Lake City, Utah

[21] Appl. No.: 783,978

[22] Filed: Oct. 3, 1985

Related U.S. Application Data

[63] Continuation-in-part of Ser. No. 591,465, Mar. 20, 1984.

[51] Int. Cl.$^4$ ............................................. H01S 3/16
[52] U.S. Cl. ..................................... 372/42; 372/5
[58] Field of Search ............... 372/5, 42; 252/301.4 H

[56] References Cited

PUBLICATIONS

Panday et al., "Shift of Band Center of OH$^-$ and OD$^-$ Impurities in Alkali Halide Matrices", Phys Rev. B. vol. 4, No. 12, 15 Dec. 1971.
Schneider et al., "Broadly Tunable Laser Action Beyond 3 mm from (F$_2^+$), Centers in Lithium-Doped KI"; Opt. Lett. vol. 6, No. 12, Dec. '81.
Baev et al., "Application of Lasers Utilizing Color Centers in Alkali Halide Crystals to Intracavity Laser Spectroscopy", Sov. JQE 9(1) Jan. '79.
German, "Color Center Lasers", SPIE vol. 247, Advances in Laser Engineering & Application (1980).
Sterk et al., "Infrared Absorption of OH$^-$ Centers in Silver Chloride", Solid State Comm. vol. 9, pp. 1473, 1971.
Kirby et al., "Far-Infrared Prop. of Lattice Resonant Mode IV Parelectric Imp.", Phys. Rev. B vol. 2, No. 2, 15 July 1970.

Primary Examiner—Leon Scott, Jr.
Attorney, Agent, or Firm—J. Winslow Young

[57] ABSTRACT

Vibrational emission from molecular defects in ionic crystals can be realized by dilute diatomic molecular defects such as, e.g., CN$^-$ molecules in alkali halide crystals. After association of F-centers to the CN$^-$ molecules, forming a new F-center/molecular defect pair, the emission can be pumped by optical F-center excitation through electronic-vibrational coupling. Using this coupling mechanism, laser action in the near infrared wavelength region is obtained between vibrational energy levels of the molecules while pumping the F-center/molecule defect in the visible wavelength range. The laser crystals are prepared by additively coloring a CN$^-$ doped alkali halide crystal and exposing the colored crystal to light having a wavelength capable of being absorbed by the electronic F-center/molecule defect transition.

9 Claims, 4 Drawing Figures

SOLID STATE VIBRATIONAL LASERS USING F-CENTER/MOLECULAR-DEFECT PAIRS IN ALKALI HALIDES

SUPPORT ACKNOWLEDGEMENT

Work on this invention was supported by NSF Grant No. DMR 81-05332, which is acknowledged with appreciation.

RELATED APPLICATIONS

This application is a continuation-in-part application of copending application Ser. No. 06/591,465 filed Mar. 20, 1984 for VIBRATIONAL FLUORESCENCE FROM $CN^-$ DEFECTS IN ALKALI HALIDE HOSTS, Fritz Luty, inventor.

BACKGROUND

1. The Field of the Invention

The present invention relates to solid state laser materials and, more particularly, to a novel defect pair in alkali halide crystals that is formed by a molecular impurity in combination with a nearest neighbor color center. The material thus formed is capable of laser emission in the infrared wavelength range under excitation with visible light.

2. Description of the Prior Art

A number of solid state lasers have been developed in the last two decades. These lasers are based exclusively on electronic transitions of impurities in various crystalline or glass materials. Among those are, for example, color center lasers using strongly phonon broadened electronic transitions of F-center-like defects in alkali halide crystals for tunable IR laser operation. Presently the total tuning range accessible with sufficiently powerful primary solid state laser sources extends from the far red portion of the spectrum to the near infrared at about 3.5 $\mu$m. Although the wavelength range beyond 3.5 $\mu$m can be covered, in principle, with diode lasers and optical parametric oscillators, these light sources have either a very low output power and high spatial beam divergence or are very complicated to operate. In view of the large application potential of near infrared lasers for numerous uses (including, for example, molecular spectroscopy of a wide variety of organic and inorganic molecules, pollution detection, and photochemistry), a strong need exists to develop superior laser systems in the infrared range.

A new approach to the development of IR-lasers became possible after the discovery of vibrational emission from dilute molecules immersed in alkali halide host crystals, reported by Y. Yang and F. Luty in Phys. Rev. Lett. 51, 419 (1983) and W. Gellermann, K. Koch, Y. Yang, and F. Luty, Bull. Am. Phys. Soc., 28, 452 (1983). They were first to observe a strong infrared emission around 4.8 $\mu$m originating from the vibrationally excited molecular impurities of $CN^-$ molecules in the host crystal KCl. Furthermore, they found that after association of F-centers to the $CN^-$ defects the emission could be efficiently and conveniently pumped by optical F-center excitation in the visible wavelength range through electronic-vibrational coupling. Besides the scientific interest in these first discovered vibrational emission effects in ionic solids, "the possibilities for laser applications, which are under study" were pointed out and discussed in the first conference report on these systems (Bull. Am. Phys. Soc. 28, 452 (1983).

A first realization of this application potential of these new solid state infrared emitters was afterwards demonstrated by R. W. Tkach, T. R. Gosnell and A. J. Sievers at Cornell University, who reported in Optics Letters 10, 122 (1984) laser oscillation at 2054 $cm^{-1}$ from $CN^-$ molecules in uncolored KBr host crystals. Pumped by 300 $\mu$J pulses from a frequency-doubled $CO_2$ laser with 100 ns pulse width, population inversion was produced between the second and first vibrational energy level of the $CN^-$ molecule. Using gold coatings directly on the crystal to provide optical feedback they observed $CN^-$ laser oscillation up to a maximum temperature of 4K.

In a later paper by the Cornell group which appeared in Optics Letters 10, 125 (1985), the same host material was operated as a continuous wave laser, pumped with a color center laser to the first overtone molecular energy level. Population inversion was produced in this way directly between the second and first vibrational energy level. Laser oscillation on this $v=2\rightarrow 1$ transition could be obtained up to a maximum temperature of 4K.

The discovered novel vibrational emission of dilute molecular systems in alkali halide crystals has already been shown to open up new possibilities for IR laser developments. However, the laser systems realized so far with $CN^-$ doped KBr crystals are still impractical for application purposes. The used pumping scheme, i.e., direct optical excitation of the first overtone level of the molecule, is rather inefficient due to the lower absorption strength (by two orders of magnitude) of this transition compared to the fundamental absorption. Furthermore, the achieved output power is only in the microwatt range and laser operation is limited to impractical low temperatures below 4K, requiring complicated and expensive crystal cooling techniques.

SUMMARY OF THE INVENTION

It is, therefore, an object of the present invention to provide a more efficient means of pumping the vibrational emission of molecular defects in alkali halides.

A further object is to provide host lattices in which the molecular vibrational laser emission can be obtained at higher crystal temperatures allowing technically more acceptable and less complicated cooling techniques.

A still further object of this invention is to provide higher output powers of the laser crystals.

Another object of this invention is to provide a laser design in which the laser crystal and the optical resonator are physically separated in order to provide for intracavity space for the purpose of inserting linewidth reducing elements or wavelength tuning devices and/or other optical elements.

These and other objects are achieved from dilute molecule-doped alkali halide crystals in which the molecules are associated to F-centers.

With great advantage, the vibrational emission can be pumped efficiently by optical F-center excitation through electronic-vibrational coupling, which means that light sources emitting in the visible wavelength region can be used for convenient IR vibrational laser excitation. This new excitation mechanism provides a population inversion between higher molecular vibrational energy levels, which can be maintained up to considerably higher crystal temperatures. This allows much simpler crystal cooling procedures, results in laser operation with higher output power levels, and makes possible the use of conventional resonator designs including wavelength tuning devices. The molecule-doped crystal is prepared, for laser operation, by (1) additive coloration so that the initial F-center concentration is in the range of $10^{17}$ F-centers/cm$^3$, (2) thermally quenching the colored crystal in order to provide a homogeneously dispersed F-center and molecule distribution throughout the crystal, (3) exposing the crystal, in the temperature range of anion vacancy mobility, to light having wavelengths which excites and ionizes the F-centers and, finally, (4) by cooling the crystal to cryogenic laser operation temperatures in a suitable optical resonator.

DETAILED DESCRIPTION OF THE INVENTION

Figure 1:
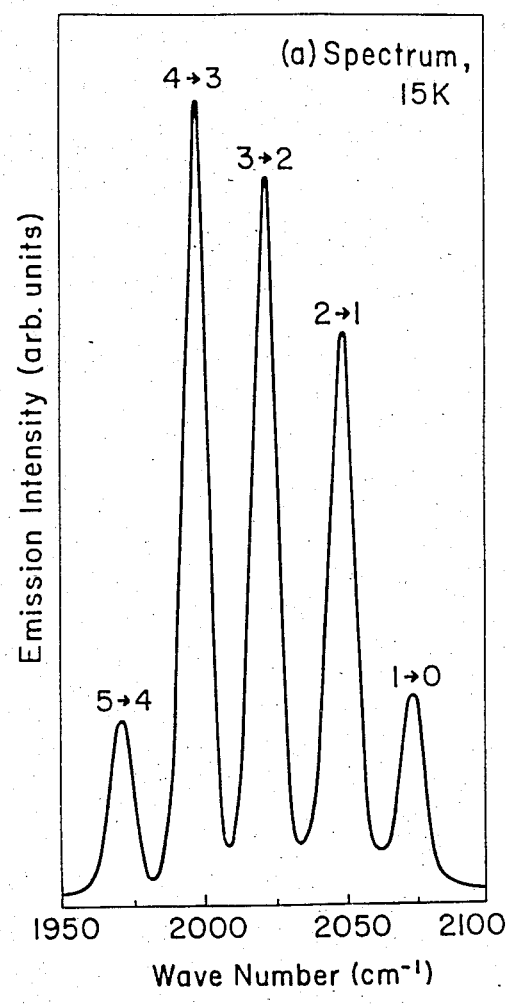
FIG. 1 is a schematic representation of the F-center/CN$^-$ defect vibrational emission around 4.8 $\mu$m (2080 cm$^{-1}$) at low temperature (15K)

The present invention is directed to solid state materials which contain novel defect pairs and allow a novel excitation scheme for providing laser emission in the infrared region of the optical spectrum. The defects of the present invention are formed by doping conventional alkali halide host crystals with dilute molecular impurities, e.g., CN$^-$, OH$^-$ etc., additively coloring the doped crystals and exposing the crystals to light at F-band frequencies at appropriate temperatures.

GENERAL DISCUSSION

Vibrational fluorescence in solid state materials was discovered for the first time about a decade ago, originating from diatomic molecules, such as CO and NO, immersed in dilute form in Van der Waals type crystals (rare gases, N$_2$). In these types of materials, both the host and guest constituents are linked by weak and short range bonds. Although population inversion could be produced in those materials at sufficiently low temperatures by excitation of the v=1 vibrational energy level of, e.g., matrix isolated CO or NO molecules, no stimulated emission could be obtained. Additionally, due to the very difficult low-temperature production and thermal instability of the crystals, these materials are not likely to be useful for any laser application purposes regardless of their interesting physical properties.

The recent discovery, however, of vibrational emission from molecules in CN$^-$ doped alkali halide crystals (ionic crystals in which the constituents are linked by strong and long range electrostatic interactions) opened up a new class of solid state materials for the study of vibrational properties and its successful application towards IR laser developments.

When a guest molecule is substituted in either a Van der Waals type or an ionic crystal, the molecule will be isolated on substitutional crystal sites, if its dimension is roughly compatible with the dimensions of the constituents of the host lattice. The rotational motion of the molecule is strongly influenced by the height of the rotational energy barrier caused by the interaction of the guest molecule with the surrounding constituents host. If the barrier is small, as compared to the free rotational energy of the molecule, almost free rotation will occur. With increasing barrier heights, the energy separation of the rotational levels increases, and hindered rotation and libration with decreasing angular amplitudes and increasing frequency will occur.

In the weakly coupled rare-gas matrices, nearly free rotation of the guest molecules is the rule, and libration is the exception. In the ionic crystals, on the other hand, higher rotational barriers producing strong angular localization and high-frequency-small-amplitude librational modes are the rule for most molecules, while weakly hindered rotation is the exception. Isolated CN$^-$ molecules, substituted in alkali halides, belong to this exception.

One of the fundamental physical properties of the matrix-isolated molecules described is the mechanism of vibrational energy relaxation. If an intra-molecular mode of the guest molecule is excited, which has a high frequency compared to the phonons of the host lattice, four different decay channels (which may occur in any combination) must in principle be considered:

(a) decay into multi-phonon processes (which may involve also localized or resonance modes);

(b) decay into lower-energy intra-molecular modes (in the case of polyatomic molecules);

(c) decay into rotational or librational modes; and (d) decay by emission of a photon.

All these possible channels have been studied experimentally and theoretically in the van der Waals solids. Due to the large reduced mass, m*, of a molecule compared to an electron and due to the infrared position of the vibrational frequency, $\omega$, the $e^2/m$ and $\omega^3$ factor in the expression for the radiative decay process (d), above, predict transition rates for vibrational emission of 6-8 orders of magnitude smaller compared to allowed electronic emission in the visible range. This small transition rate makes it evident that nonradiative decay channels [(a), (b), (c) above,] of higher rates can easily quench the radiative transition, so that strong vibrational emission has been rarely observed in solids.

One of the few exceptions are isolated molecules in rare-gas matrices, which, at sufficiently low temperatures, can have a population decay which is almost exclusively radiative. The spontaneous emission occurs with a lifetime between 10 and 100 ms. In these long lived excited species an intermolecular vibrational energy transfer has been observed. In that process vibrational energy is transferred from excited molecules to higher levels of the vibrational energy ladder of neighboring excited molecules. As the anharmonic coupling results in a decrease of the energy level spacing between adjacent levels, at low crystal temperature, exothermic processes produce an upward cascading of the vibrational energy. This (lattice-) phonon assisted energy transfer, which is likely to depend strongly on the localized orientational motion of the guest molecules, can thus produce a population inversion between higher vibrational energy levels. The extensive experimental and theoretical work on the vibrational relaxation mechanisms in Van der Waals crystals is reviewed in detail in an article by H. Dubost, published in Springer Series in Chemical Physics, Vol. 34, pp. 145-257 (1984).

In contrast to the rather well studied Van der Waals solid matrices, investigations into the vibrational relaxation kinetics of molecules in ionic solids have been very rare. Rebane and co-workers have investigated the vibrational (and rotational) relaxation effects of $NO_2^-$ defects in alkali-halide hosts, reported in "Luminescence of Crystals, Molecules and Solutions," ed. F. Williams (Plenum, N.Y., 1973). By exciting the electronic transition (with vibrational/rotational substructure) and observing hot luminescence, they could estimate vibrational relaxation times of $NO_2^-$ molecules in the excited electronic state. Similar types of studies and results were obtained on $O_2^-$ defects in alkali-halides as reported by R. Florian et al. in Phys. Rev. A 29, 2709 (1984). Sievers and coworkers have made extensive vibrational relaxation studies on the tetrahedral $ReO_4^-$ molecule in alkali-halides, which can be resonantly excited in its highest energy vibrational mode by $CO_2$ laser radiation. In all these studies, reported in Phys. Rev. Lett. 47, 1082 (1981), very rapid ($10^{-11}$–$10^{-9}$ sec) relaxation processes have been found, discouraging any sizeable vibrational emission effect. For the $ReO_4^-$ molecule they showed that the rapid relaxation channel is due to decay of the excited mode into a combination of lower-energy vibrational modes of the tetrahedral molecule (channel b).

A simpler situation is presented for the case of diatomic molecules (such as $OH^-$, $CN^-$...), which have only one internal stretching mode, so that the decay channel (b) is not available. Moreover, the rotational behavior and modes of these dipole molecules have been extensively studied and clarified for many host materials.

Studying these molecules Yang and Luty discovered a strong vibrational emission of dilute $CN^-$ molecules immersed in KGl and KBr, emitting at the wavelength (4.8 $\mu$m) of their stretching vibration. The lifetime of the vibrational emission was found to be about 6 ms at low temperatures, and the emission intensity remained strong up to fairly high temperatures of about 70K, where growing effects of multiphonon (nonradiative) deexcitation processes start to quench the emission.

The vibrational emission of isolated $CN^-$ molecules could be obtained, analogous to molecules in rare gas matrices, either by excitation of the strong fundamental stretching absorption band around 4.8 $\mu$m or by excitation of the (two orders of magnitude weaker) first overtone absorption band around 2.4 $\mu$m, as reported by K. Koch, Y. Yang and F. Luty in Phys. Rev. B 29, 5840 (1984).

The usefulness of the vibrational emission of $CN^-$ molecules in alkali halides for laser application purposes was first demonstrated by the Cornell group using $CN^-$ molecules in the host KBr as active material. As pump source a frequency doubled $CO_2$ laser was used, exciting the fundamental absorption band of the $CN^-$ molecule at 2078.8 cm$^{-1}$. The pump laser pulse excites the $v=0\rightarrow 1$ fundamental transition leaving the molecules in the first excited vibrational state. Due to long range dipole-dipole coupling two neighboring excited molecules then quickly exchange vibrational energy quanta, leaving one molecule in the ground state and the other in the second excited state. To conserve energy in this transfer a lattice phonon is emitted at a frequency equal to that of the anharmonic shift. As a result of this phonon assisted vibrational energy transfer a population inversion can be produced between the $v=2$ and $v=1$ energy level. Laser oscillation was obtained, using a gold coated crystal rod, with small uncoated surface regions providing pump power input and $CN^-$ laser output coupling. The pulse energy of the pump pulse at $CN^-$ lasing threshold was about 100 $\mu$J, and the peak output power was estimated to be in the few microwatt range at maximum 300 $\mu$J peak pump energy. Laser oscillation terminated at a crystal temperature of 4K.

The pumping mechanism employed by the Cornell group has two major disadvantages. First, the vibrational-vibrational (v-v) energy transfer limits the laser to only pulsed operation when pumped on the $v=0\rightarrow 1$ transition, and second, at increased temperatures v-v transfer depopulates the $v=2$ state in favor of the $v=1$ state thus restricting laser operation to temperatures below 4K.

In a following paper the Cornell group reported attempts to overcome these limitations by pumping directly the (weak) $v=0\rightarrow 2$ vibrational overtone transition, using the same active material, and a color center laser for optical pumping. In this way they obtained population inversion and continuous laser operation on the $v=2\rightarrow 1$ transition at 4.9 $\mu$m. However, due to the thermally activated v-v transfer effect, the gain was still quenched at temperatures above 4K and hence no laser oscillation could be observed at higher than liquid helium temperatures. At 1.7 K crystal temperature a cw lasing threshold pump power of 1.5 mW was measured; maximum $CN^-$ laser output power was estimated to be a few microwatts.

The laser operation of $CN^-$ doped KBr crystals, realized by the Cornell group in this way, still shows a number of severe limitations for practical application purposes. First, the pumping scheme uses the first overtone transition of the $CN^-$ molecule, which is about two orders of magnitude weaker than the fundamental absorption strength, and therefore necessitates the use of fairly thick and impractical crystal dimensions. Secondly the width of the first overtone absorption of $CN^-$ in KBr has a small value of 0.5 cm$^{-1}$ and therefore requires a precisely tuned excitation source for efficient optical pumping. Third, laser operation is only possible at impractical low temperatures due to thermal quenching of the gain at the used doping levels. A potential reduction of this quenching process by using lower molecular doping levels is excluded as it interferes with the need for a sufficiently high absorption coefficient at the first overtone transition used for optical pumping.

THE NEW ACTIVE MATERIALS AND PUMPING SCHEME

Figure 2:
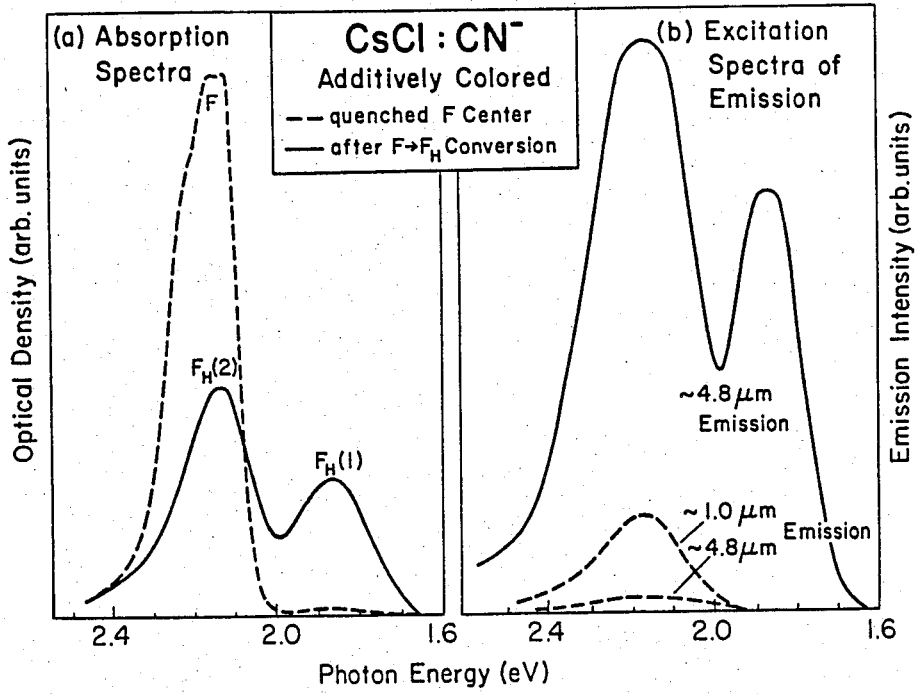
FIG. 2 is a schematic representation of the F-center/CN$^-$ defect absorption spectra after optimum conversion (a), and the excitation spectra for its vibrational emission (b)

New optical properties of the vibrational emission from substitutional molecules in alkali halide hosts were observed when associating F-centers with the former defects. The first realization of this, an F-center/$CN^-$ defect pair on a next nearest neighbor (110 crystalline) position in KCl, shows an electronic absorption and emission band of similar strength and only slight spectral broadening and red shift compared to the F-center. As a new effect, however, it displays a weak energy transfer from the excited F-electron to the $CN^-$ internal stretching mode, leading to excitation of the first vibrational energy level of the molecule and subsequent radiative relaxation. Whereas the coupling of the $CN^-$ to optical F-center excitation was found to have only a low quantum efficiency ($\eta\approx 0.04$) and a low energy conversion rate ($\eta_E\approx 4\times 10^{-3}$) from visible pumping into infrared emission light in the host KCl, a study of vibration emission properties of CN⁻ molecules in several other lattices revealed a strong increase in the F-electron/CN⁻ molecule vibrational coupling, particularly in the CsCl host lattice. In the body-centered cesium halide crystal structure the F/CN⁻ pair is oriented along a (100) crystal direction. Similar to $F_A$-centers in KCl the excited 2p F-center state is split by the associated CN⁻ molecule into two spectrally separate absorption transitions, polarized parallel and perpendicular to the (100) pair axis. In an optimally aggregated crystal, where all F-centers are associated with molecules, the normal F-center emission is almost completely quenched and replaced by a strong molecular vibrational emission around 4.8 $\mu$m (FIG. 1). The latter can be excited in either of the two absorption bands in the visible (FIG. 2). Experiments on the dynamics of the vibrational emission showed that optical pumping in the visible populates quickly and efficiently excites higher vibrational energy levels of the molecule, leading directly to a population inversion between them.

Figure 3:
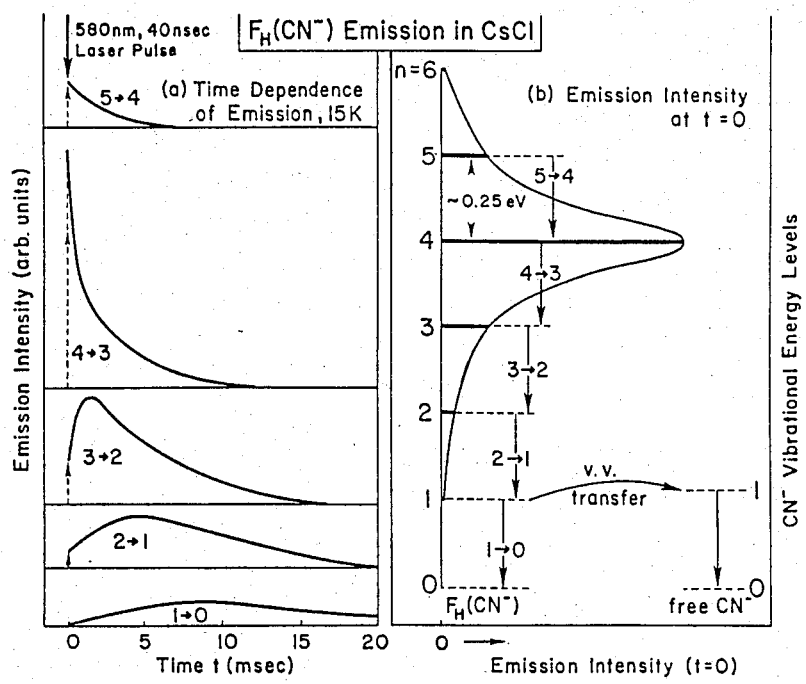
FIG. 3 is a schematic representation of the time dependence of the vibrational emission after pulsed visible excitation (a), and its spectrally resolved emission strength (b)

This process is illustrated in FIG. 3 showing the time dependence of the emission intensity in the five observed F/CN⁻ emission bands after pulsed laser excitation in the visible (a), and the emission intensity from the five lowest excited CN⁻ vibrational states, immediately after pulsed electronic excitation, plotted into the level diagram (b). In contrast to pumping schemes of uncolored crystals, containing only dilute molecules, as used by the Cornell group, population inversion between higher excited molecular vibrational levels is obtained in the new F center/CN⁻ defect pair directly, thus eliminating the necessity for vibrational energy transfer processes for that purpose.

Using additively colored CN⁻ doped crystals with appropriate concentrations of aggregated F-center/CN⁻ defects, and optical pumping of the electronic absorption in the visible we have recently obtained vibrational laser oscillation up to crystal temperatures of 77K. The laser crystals were prepared as follows. Platelets of about $3\times10\times10$ mm$^3$ were cut from the boule and additively colored in a potassium vapor heat pipe for about 15 hours at a crystal temperature of about 450° C. Afterwards the crystals were quenched to room temperature (in order to provide a homogeneous coloration), manually polished in dim room light, mounted into the laser cavity, cooled to about $-100°$ C. and exposed to weak light exciting the F-center absorption band for about five minutes in order to produce the F center/CN⁻ defect pairs. The crystals were then cooled to laser operation temperatures (77K and lower).

Laser operation of the new F/CN⁻ defects could be obtained on the three strongest vibrational transitions of the molecules at around 2000, 2025 and 2050 cm$^{-1}$. As pump source a Kr⁺ laser was used operating on the 647 nm line.

At liquid nitrogen operation temperature the CN⁻ laser output intensity was observed to decay very fast (within a few ms) to below the lasing level when pumped cw. Insertion of a low duty cycle (100:1) mechanical chopper producing pump pulses of about 10 $\mu$sec duration drastically improved the laser performance, resulting in laser operation of a particular crystal spot for a period of a few hours. When operating the laser at 65 K (cooling the crystal with solid nitrogen) further improved laser operation was observed, allowing larger duty cycles (up to 50:50) of the mechanical chopper and pump pulse lengths up to 20 msec. When cooling the crystal to about 30K continuous wave laser operation could be obtained with a maximum output power in the range of 1 mW.

The broad absorption transitions of the new F-center/molecule defect allow optical pumping in the visible with a wide wavelength variation of light sources overlapping the absorption. Besides excitation with the red Kr⁺ laser line (647 nm) IR laser oscillation could also be obtained when exciting the short wavelength absorption band of the defect, using a dye laser at 580 nm. The low threshold pump powers (in the range of a milliwatt) of the laser allowed also the use of an inexpensive 10 mW He-Ne pump laser and it is expected that due to the about 200 nm broad spectral width of the two absorption bands of the defect, laser oscillation can also be achieved with conventional inexpensive light sources such as Xe lamps.

EXAMPLE

About 70 grams of CsCl with 0.1 mole percent CsCN were melted and recrystallized into a single crystal using conventional crystal growth techniques. The resultant CsCl:CN⁻ crystal system had a concentration of CN⁻ molecules of about $5\times10^2$ mole percent. Crystal discs of about 3 mm thickness and 1.5 cm diameter were then cut from the boule and additively colored in a cesium heat pipe for several hours at a crystal temperature of 450° C. and a cesium vapor pressure of 15 Torr.

After coloration the crystal disc was sanded down to a thickness of about 2 mm and manually polished to optical quality using slurries of Linde A and B (aluminum oxide power of 0.3 micrometer and 0.05 micrometer sizes, respectively) and pure ethanol on a microcloth pad.

After polishing the crystal was reduced in size to about 2 mm$\times$8 mm$\times$6 mm, and mounted into a laser cavity. In order to avoid photochromic processes in the material, crystal handling was performed in dim room light.

At a temperature of $-100°$ C. the laser crystal was then exposed to weak light levels exciting the F center absorption band near 590 nm for about five minutes in order to provide the formation of the laser active F/CN⁻ defects. The crystals were then cooled to laser operation temperatures (77K and lower).

Figure 4:
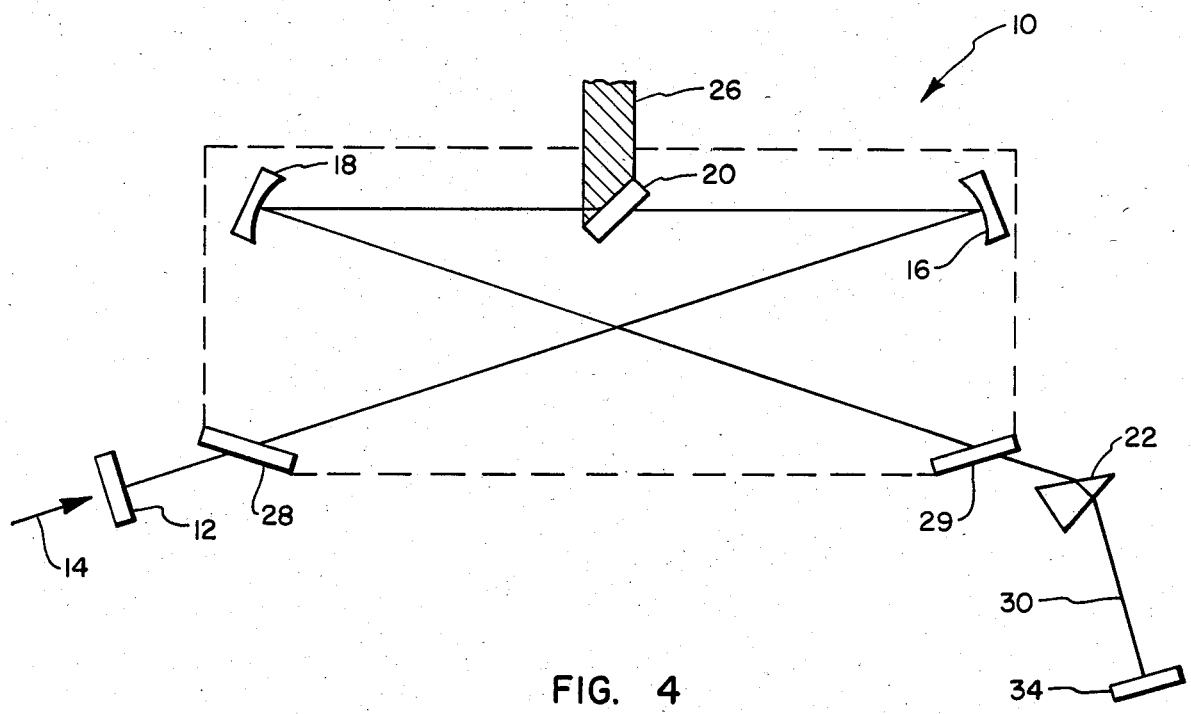
FIG. 4 is a schematic representation of the resonator configuration used for laser operation of the crystals of this invention.

Referring now to FIG. 4, the laser resonator 10 consists of an astigmatically compensated, x-type four mirror configuration formed by (1) a plane input coupling mirror 12 which is highly transmissive for the pump light 14 and highly reflective for the crystal emission around 5 $\mu$m; (2) two highly reflective folding mirrors 16 and 18 (75 mm curvature radius) focusing the pump beam and the IR laser beam to overlapping diffraction limited spots inside the center of the crystal 20; (3) a sapphire prism 22 serving as wavelength selective element; and, (4) a plane output coupling mirror 24 transmitting about 10% at 5 $\mu$m. The crystal 20 is oriented at Brewster's angle with respect to the pump beam direction.

As pump source a Kr⁺ laser was used which operated on the 647 nm line. Laser operation could be obtained on the three strongest vibrational emission transitions at 5.016 $\mu$m (4→3), 4.96 $\mu$m (3→2) and 4.87 $\mu$m (2→1) with 10% output coupling. Laser threshold was in the range of a few mW. Even when using a 60% output coupling mirror, the laser still operated in the strongest 4→3 transition and had a maximum output power in the range of 1 mW. Crystal temperature was kept at around 30K by mounting crystal 20 on a cold support 26 cooled below 77K.

The entire resonator system 10 was maintained under vacuum with windows 28 and 29 providing optical entry and exit for the pump beam 14 and the output laser energy 30, respectively.

What is claimed and desired to be secured by United States Letter Patent is:

1. A laser having a laser action in the infrared wavelength region comprising:
    an alkali halide crystal having dilute diatomic molecular defects;
    F-center defects in said alkali halide crystal associated with said molecular defects;
    cooling means for cooling said crystal below about 77K;
    optical pumping means for pumping the F-center/molecular defect pairs in the visible wavelength range.

2. The laser defined in claim 1 wherein the alkali halide is selected from the group consisting of NaCl, NaBr, NaI, KCl, KBr, KI, RbCl, RbBr, RbI, CsCl, CsBr, and CsI.

3. The laser defined in claim 1 wherein the diatomic molecules are selected from the group consisting of $CN^-$, $OH^-$, $OD^-$, $SH^-$, $TeH^-$ or any other diatomic molecule.

4. A laser having laser action in the infrared wavelength region comprising:
    an alkali halide crystal doped with diatomic molecular defects:
    F-center defects formed in said alkali halide crystals in association with said $CN^-$ molecular defects;
    cooling means for cooling said crystal below about 77K; and
    optical pumping means for optically pumping said F-center/molecular defects in the visible wavelength region to produce infrared laser action.

5. The laser defined in claim 4 wherein the alkali halide is selected from the group consisting of NaCl, NaBr, NaI, KCl, KBr, KI, RbCl, RbBr, RbI, CsCl, CsBr, and CsI.

6. The laser defined in claim 4 wherein the diatomic molecules are selected from the group consisting of $CN^-$, $OH^-$, $OD^-$, $SH^-$, $TeH^-$ or any other diatomic molecule.

7. A method for producing laser action in the infrared wavelength region comprising:
    obtaining an alkali halide crystal;
    producing molecular defects in the alkali halide crystal by doping said crystal with dilute diatomic molecules;
    creating F-center defects in the alkali halide crystal adjacent the molecular defects;
    cooling the crystal below about 77K; and
    pumping the F-center/molecular defect in the visible wavelength range thereby producing laser action in the infrared wavelength region.

8. The method defined in claim 7 wherein the obtaining step comprises selecting the alkali halide from the group consisting of NaCl, NaBr, NaI, KCl, KBr, KI, RbCl, RbBr, RbI, CsCl, CsBr, and CsI.

9. The method defined in claim 7 wherein the producing step comprises selecting the diatomic molecules from the group consisting of $CN^-$, $OH^-$, $OD^-$, $SH^-$, $TeH^-$ or any other diatomic molecule.

* * * * *